United States Patent [19]
Xu et al.

[11] Patent Number: 5,552,977
[45] Date of Patent: Sep. 3, 1996

[54] THREE PHASE INVERTER CIRCUIT WITH IMPROVED TRANSITION FROM SVPWM TO SIX STEP OPERATION

[75] Inventors: Xingyi Xu; Doug Deng, both of Canton, Mich.

[73] Assignee: Ford Motor Company, Dearborn, Mich.

[21] Appl. No.: 493,221

[22] Filed: Jun. 20, 1995

[51] Int. Cl.⁶ .................................................. H02M 7/162
[52] U.S. Cl. .................................. 363/41; 363/97; 318/811
[58] Field of Search .................................. 363/40, 41, 97, 363/131; 318/811

[56] References Cited

U.S. PATENT DOCUMENTS

| | | | |
|---|---|---|---|
| 3,792,286 | 2/1974 | Meier | 307/58 |
| 4,267,499 | 5/1981 | Kurosawa | 318/800 |
| 4,678,248 | 6/1987 | Depenbrock | 318/805 |
| 4,713,745 | 12/1987 | Schauder | 363/161 |
| 4,780,657 | 10/1988 | Brown et al. | 318/805 |
| 4,808,903 | 2/1989 | Matsui et al. | 318/800 |
| 4,953,069 | 8/1990 | Braun et al. | 363/41 |
| 5,182,701 | 1/1993 | Mochikawa et al. | 363/98 |
| 5,194,797 | 3/1993 | Kahkipuro | 318/727 |
| 5,280,419 | 1/1994 | Amler | 363/37 |
| 5,309,349 | 5/1994 | Kwan | 363/98 |
| 5,355,297 | 10/1994 | Kawabata et al. | 363/43 |
| 5,376,872 | 12/1994 | Hara | 318/799 |
| 5,450,306 | 9/1995 | Garces et al. | 363/41 |

OTHER PUBLICATIONS

Broeck et al., *Analysis and Realization of a Pulse Width Modulator Based on Voltage Space Vectors*, Institute for Power Electronics and Electrical Drives, 1986.

Rowan et al., *Operation of Naturally Sampled Current Regulators in the Transition Mode*, IEEE Transactions on Industry Applications, vol. IA–23, No. 4, Jul./Aug. 1987.

Primary Examiner—Peter S. Wong
Assistant Examiner—Adolf Berhane
Attorney, Agent, or Firm—Roger L. May; Mark S. Sparschu

[57] ABSTRACT

When negative times are calculated for zero space vectors of a SVPWM controlled three phase inverter circuit, the zero vector times are set to zero, the non-zero space vector closer to a commanded space vector is preserved, and the non-zero space vector farther from the commanded space vector is truncated. Thus, control of the inverter circuit seamlessly transits from SVPWM to full six step operation. In one arrangement, for each negative calculated zero space vector time, the larger of the non-zero space vector times is set to the minimum of its calculated time and the pulse width modulation control period (TPWM), and the smaller of the calculated non-zero space vector times is set equal to TPWM less the set value of the larger of the non-zero space vector times. In another arrangement, each negative calculated zero space vector time is algebraically combined with the smaller of the non-zero space vector times. If the resulting non-zero space vector time is greater than or equal to zero, it is used together with the calculated time for the larger of the non-zero space vectors. If the resulting non-zero space vector time is less than zero, the time for the larger of the non-zero space vectors is set to TPWM and the time for the smaller of the non-zero space vectors is set to zero. For both of these arrangements, the zero space vector time is set to zero.

5 Claims, 4 Drawing Sheets

THREE PHASE INVERTER CIRCUIT WITH IMPROVED TRANSITION FROM SVPWM TO SIX STEP OPERATION

BACKGROUND OF THE INVENTION

The present invention relates in general to a three phase inverter circuit wherein a plurality of switching devices are turned on and off to convert a dc voltage to a three phase ac voltage and, more particularly, to a method for operating such an inverter circuit to provide improved transition from a space vector pulse width modulation (SVPWM) operating mode to a six step operating mode.

FIG. 1 illustrates an inverter circuit 100 including six switching devices SA+, SA−, SB+, SB−, SC+ and SC− connected into a bridge circuit between circuit buses 102 and 104 which are maintained at $\pm V_{dc}/2$, respectively, relative to a virtual neutral point in a manner common in the art. The switching devices are operated by a pulse width modulation (PWM) switching driver circuit 106 in response to a command vector $V_s^*$ to construct three phase ac power for a three phase load, such as the three phase motor 108, from a source of dc voltage $V_{dc}$.

Since either the upper or the lower switching device of each of the three legs of the inverter circuit 100 is turned on, the switching states of the inverter circuit 100 can be represented by three binary numbers (SA, SB, SC). For this representation, a "1" indicates that the upper or + switching device is on and a "0" indicates that the lower or − switching device is on. Thus, (0, 0, 0) indicates that SA−, SB− and SC− are on and SA+, SB+ and SC+ are off; (1, 0, 0) indicates that SA+, SB− and SC− are on and SA−, SB+ and SC+ are off; and so on.

The eight resulting switching or voltage vectors V0 through V7 are shown in FIG. 2 with (0, 0, 0) or V0 and (1, 1, 1) or V7 being zero vectors. The hexagon spanned by the six non-zero voltage vectors V1 through V6 can be divided into six regions, 1 through 6, with each region being spanned by two of the non-zero voltage vectors. The magnitude or length of each non-zero voltage vector is equal to $2V_{dc}/3$ where $V_{dc}$ is again the magnitude of the source of dc voltage.

Vectors can be represented by their projections onto X and Y axes superimposed onto the hexagon spanned by the vectors V1 through V6. For example, the voltage command vector $V_s^*$ can be projected to define $V_x^*$ and $V_y^*$ as shown in FIG. 3. The projections of each non-zero vector onto the X and Y axes can be determined from the equations:

$$V_{i,x} = 2V_{dc}/3[\cos((i-1)60°)] \quad (1)$$

$$V_{i,y} = 2V_{dc}/3[\sin((i-1)60°)] \quad (2)$$

where i is the index of the vectors, i.e, i=1 represents voltage vector V1, i=2 represents voltage vector V2, and so forth; i can also be interpreted as the index for the regions 1 through 6.

A number of known pulse width modulation (PWM) control arrangements are used to control the switching devices SA+, SA−, SB+, SB−, SC+ and SC− to generate a three phase balanced set of ac voltages from the fixed dc voltage $V_{dc}$. One commonly used switching arrangement for generating the gating patterns for three phase operation is known as space vector pulse width modulation (SVPWM). For this arrangement, a balanced three phase voltage command is represented by a voltage command vector rotating in the X-Y plane. Thus, for each pulse width modulation control period (TPWM), a three phase voltage command is represented by a voltage command vector in the X-Y plane spanned by the six non-zero voltage vectors V1 through V6 available from the inverter circuit 100. Each voltage command vector is then approximated or constructed by combining properly proportioned vectors which are aligned with the two adjacent non-zero vectors and an appropriate one of the zero vectors, V0 or V7.

For example, as shown in FIG. 3, the voltage command vector $V_s^*$ is approximated by $V_1^*$, $V_2^*$ and one of the zero vectors, V0 or V7. Zero vectors preferably are chosen so that only one of the switching devices SA+, SA−, SB+, SB−, SC+ and SC− needs to change its on/off state for each transition from one non-zero vector to the zero vector to the next non-zero vector. The size or time span for each of the voltage vectors is selected to balance the volt-seconds commanded by the command vector and the actual volt-seconds applied by the inverter circuit 100. To this end, t1 represents the time duration of Vi, t2 represents the time duration of Vi+1 and t0 represents the time duration of the zero vector, V0 or V7. In order to maintain the volt-second balance, the following vector equation must be satisfied:

$$V_s^* \cdot TPWM = Vi \cdot t1 + V(i+1) \cdot t2 + 0 \cdot t0 \quad (3)$$

where t1+t2+t0=TPWM. In terms of X-Y components:

$$V_x^* \cdot TPWM = V_{i,x} \cdot t1 + V_{i+1,x} \cdot t2 + 0 \cdot t0 \quad (4)$$

$$V_y^* \cdot TPWM = V_{i,y} \cdot t1 + V_{i+1,y} \cdot t2 + 0 \cdot t0 \quad (5)$$

Using equations (1), (2), (4) and (5), the space vector PWM times t1, t2 and t0 can be determined by solving the following equations:

$$t1 = \sqrt{3} \cdot TPWM/V_{dc}[\sin(i \cdot 60°)V_x^* - \cos(i \cdot 60°)V_y^*] \quad (6)$$

$$t2 = \sqrt{3} \cdot TPWM/V_{dc}[-\sin((i-1)60°)V_x^* + \cos((i-1)60°)V_y^*] \quad (7)$$

$$t0 = TPWM - t1 - t2 \quad (8)$$

where i is the region index, 1 through 6, for example, i=1 is for voltage command vectors which lie between V1 and V2, i=2 is for voltage command vectors which lie between V2 and V3, and so on as illustrated in FIG. 3. While space vector pulse width modulation (SVPWM) as described is well known to those skilled in the art, those desiring a more in depth understanding and analysis are referred to H. W. van der Broeck et al., "*Analysis and Realization of a Pulse Width Modulator Based on Voltage Space Vectors*", IEEE/IAS 1986 Annual Meeting, pp. 244–251.

It can be shown that SVPWM can achieve a linear range of control as long as the magnitude of the voltage command vector $V_s^*$ is less than or equal to $(1/\sqrt{3}) \cdot V_{dc}$. Graphically, this linear control area corresponds to the inside of the circle imposed within the hexagon of FIG. 3. Unfortunately, if the magnitude of the voltage command vector $V_s^*$ is greater than $V_{dc}\sqrt{3}$, t0 can be negative indicating that zero vectors can no longer be applied. In this case, t1+t2 is greater than TPWM and truncation of t1 and/or t2 is necessary. Accordingly, SVPWM starts to drop zero vectors with more and more zero vectors being dropped as the magnitude of the voltage command vector $V_s^*$ is increased. FIG. 4 illustrates a phase voltage waveform generated in a linear PWM mode of operation. FIG. 5 illustrates a phase voltage waveform generated in a pulse dropping mode of operation just described. And, FIG. 6 illustrates a standard six step mode of operation which results in the highest possible fundamental component and hence represents the best utilization of available dc voltage.

It is desirable to switch to the six step mode of operation when $V_s^*$ becomes greater than $V_{dc}/\sqrt{3}$. Unfortunately, a jump in control directly to the six step mode of operation creates a large disruptive transient in the three phase voltage being generated. Another common arrangement for handling excessive magnitude of the voltage command vector $V_s^*$ is to truncate both t1 and t2 proportionally so that the phase angle of the voltage command vector is maintained. For this arrangement, $$t1=[t1/(t1+t2)] \cdot TPWM, \text{ and} \quad (9)$$

$$t2=[t2/(t1+t2)] \cdot TPWM. \quad (10)$$

Unfortunately, this arrangement can not achieve full six step operation.

In U.S. Pat. No. 5,182,701, another arrangement for handling excessive magnitude of the voltage command vector $V_s^*$ is disclosed wherein half of the t0 value is subtracted from both t1 and t2. While this arrangement will ultimately result in full six step operation, the magnitude of the voltage command vector $V_s^*$ must be very large to result in six step operation and the transition is long and drawn out. Accordingly, there is a need for an improved arrangement for performing transition from SVPWM operation of an inverter circuit to six step operation.

SUMMARY OF THE INVENTION

This need is met by the invention of the present application wherein when times calculated in response to a voltage command vector for zero space vectors of a SVPWM inverter circuit control are negative, the zero vector times are set to zero to eliminate the zero space vectors, the non-zero space vector closer to a commanded space vector is preserved and the non-zero space vector farther from the commanded space vector is truncated. In this way, control of the inverter circuit can seamlessly transit from SVPWM mode of operation to full six step mode of operation and the phase angle of the fundamental component of the six step waveform will coincide with that of the voltage command vector.

The transition control can be performed in a variety of ways. For example, for each calculated zero space vector time which is negative, the larger of the non-zero space vector times can be set to the minimum of its calculated time or the pulse width modulation control period (TPWM), and the smaller of the calculated non-zero space vector times is set equal to TPWM less the set value of the larger of the non-zero space vector times. In another arrangement, each calculated zero space vector time which is negative is algebraically combined with the smaller of the non-zero space vector times. If the resulting non-zero space vector time (for the smaller of the non-zero space vectors) is greater than or equal to zero, it is used together with the calculated time for the larger of the non-zero space vectors. If the resulting non-zero space vector time (again for the smaller of the non-zero space vectors) is less than zero, the time for the larger of the non-zero space vectors is set to TPWM and the time for the smaller of the non-zero space vectors is set to zero. For both of these arrangements, the zero space vector time is set to zero.

In accordance with one aspect of the present invention, a method of controlling a three phase inverter circuit which provides improved transition from space vector PWM operation to six step operation comprises the steps of: calculating the space vector PWM times t1, t2 and t0 for space vector PWM operation, t1 and t2 corresponding to non-zero space vectors associated with a commanded space vector and t0 corresponding to a zero space vector, the sum of t1, t2 and t0 equaling a total pulse width modulation control period, TPWM; comparing t0 to 0; setting transition space vector PWM times t1', t2' and t0' for calculated t0 values less than 0 to preserve the non-zero space vector which is closer to the commanded space vector, truncate the non-zero space vector which is farther from the commanded space vector and eliminate the zero Space vector; and, operating the inverter circuit in accordance with the transition space vector PWM times t1', t2' and t0'.

It is thus a feature of the present invention to provide improved methods for operating a three phase inverter circuit to provide improved transition from a space vector pulse width modulation (SVPWM) operating mode to a six step operating mode.

Other features and advantages of the invention will be apparent from the following description, the accompanying drawings and the appended claims.

DETAILED DESCRIPTION OF THE INVENTION

Figure 3:
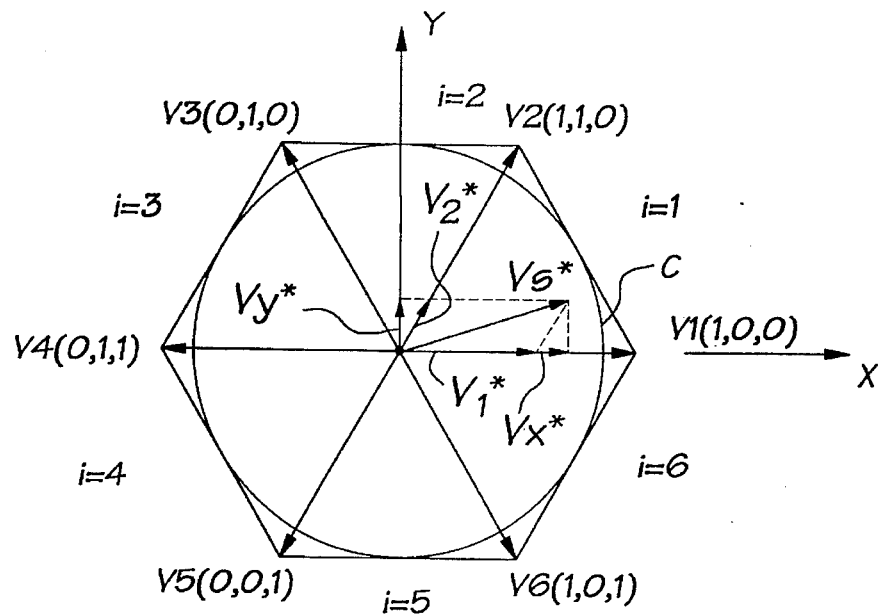
FIG. 3 is a vector diagram illustrating operation of the inverter circuit of FIG. 1 to approximate the voltage command vector $V_s^*$ by combination of $V_1^*$, $V_2^*$ and one of the zero vectors, V0 or V7.
Figure 4:
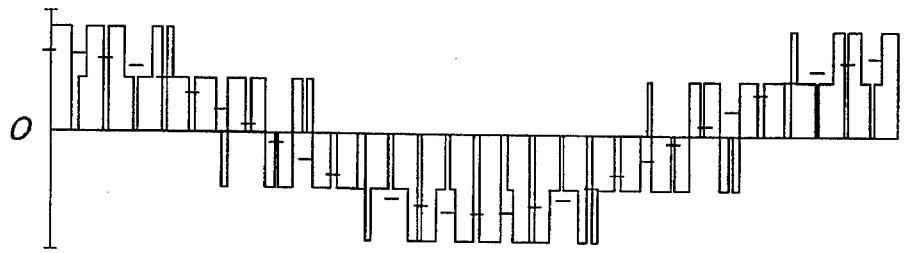
FIG. 4 illustrates a phase voltage waveform generated by linear PWM operation of the three phase inverter circuit of FIG. 1.
Figure 5:
FIG. 5 illustrates a phase voltage waveform generated by a pulse dropping mode of operation of the three phase inverter circuit of FIG. 1.
Figure 6:
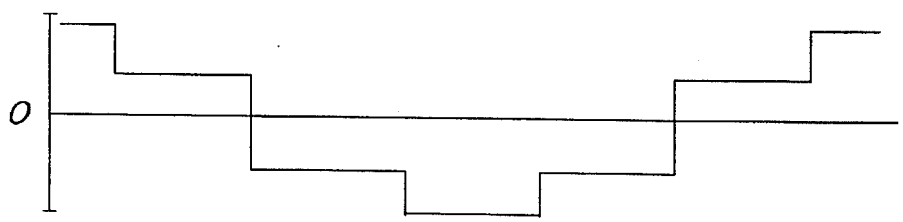
FIG. 6 illustrates a standard six step mode of operation of the three phase inverter circuit of FIG. 1.
Figure 7:
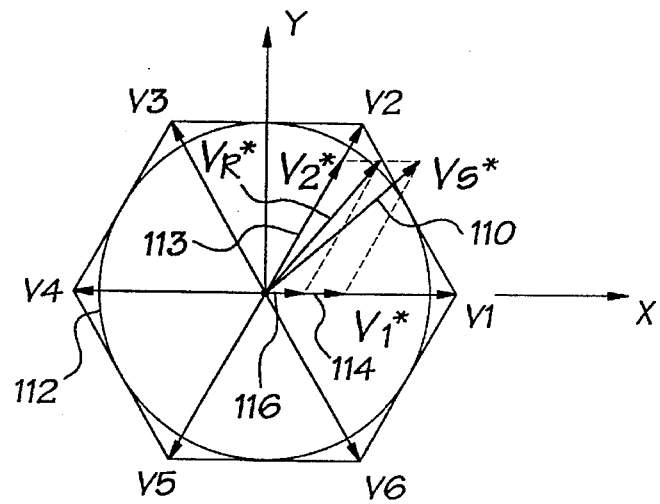
FIG. 7 is a vector diagram illustrating operation of the inverter circuit of FIGS. 1 in accordance with the present invention to transition from SVPWM to six step operation.

The invention of the present application will now be described with further reference to the drawing figures. As previously mentioned with reference to FIG. 3, SVPWM can achieve a linear range of control as long as the magnitude of the voltage command vector $V_s^*$ is less than or equal to $(1/\sqrt{3}) \cdot V_{dc}$. Unfortunately, if the magnitude of the voltage command vector $V_s^*$ is greater than $V_{dc}/\sqrt{3}$, for example as shown in FIGS. 7, t0 becomes negative when calculated in accordance with equations (6)–(8) indicating that zero vectors can no longer be applied. In addition, t1+t2 is greater than TPWM, the pulse width modulation control period, and truncation of t1 and/or t2 is necessary.

For such commanded voltages, it is desirable to transition as smoothly as possible into six step operation which results in the highest possible fundamental component and hence represents the best utilization of the available dc voltage level. Unfortunately, a jump in control directly to the six step mode of operation creates a large disruptive transient in the three phase voltage being generated. Further, currently used control arrangements either do not result in transition to six step operation or are less than totally satisfactory in that transition takes too much time or is not as smooth as desired for many application.

The present invention ensures a smooth transition from SVPWM operation to six step operation by setting zero space vector times to zero, preserving the non-zero space vector closer to a command space vector and truncating the non-zero space vector farther from the commanded space vector when the commanded space vector results in zero space vector times which are negative. In this way, control of the inverter circuit 100 seamlessly transitions from SVPWM operation to full six step operation. The transition mode of operation of the present application is illustrated in the vector diagram of FIG. 7.

As shown, when a command vector $V_s^*$ 110 has a magnitude which is in excess of $V_{dc}/\sqrt{3}$, i.e. the vector extends beyond the circle 112 imposed within the hexagon of FIG. 7, t0 becomes negative when calculated in accordance with equations (6)–(8) and t1+t2 is greater than TPWM. In accordance with the present invention, the non-zero space vector $V_2^*$ 113 closer to the command vector $V_s^*$ 110 is preserved and the non-zero space vector $V_1^*$ 114 is truncated to the vector 116 such that the sum of the times defining the non-zero space vectors 113, 116 is equal to TPWM and combine to form a resultant vector $V_R^*$.

It is noted that if the magnitude of the commanded space vector becomes very large, the calculated values of t1 and/or t2 may be greater the total pulse width modulation control period (TPWM). If these instances are likely to be encountered in a given application, it is necessary to limit the modified or transition times for the non-zero space vectors such that their sum is less than or equal to TPWM. While a wide variety of implementations of the present invention are possible, two illustrative implementations will now be described. Both of these implementations provide appropriate limitations of the modified or transition times for the non-zero space vectors such that they can accommodate commanded space vectors becoming sufficiently large that the calculated values of t1 and/or t2 exceed TPWM.

Figure 1:
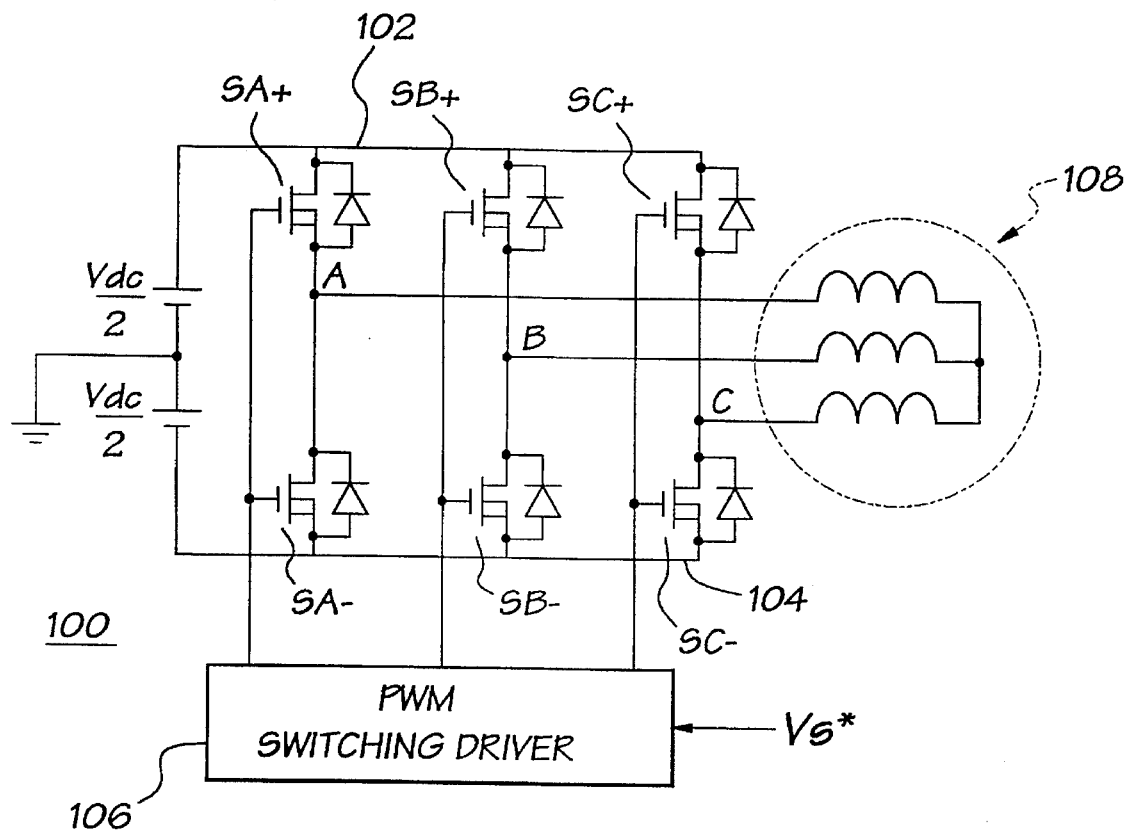
FIG. 1 is a schematic block diagram of a three phase inverter circuit operable in accordance with the present invention.
Figure 2:
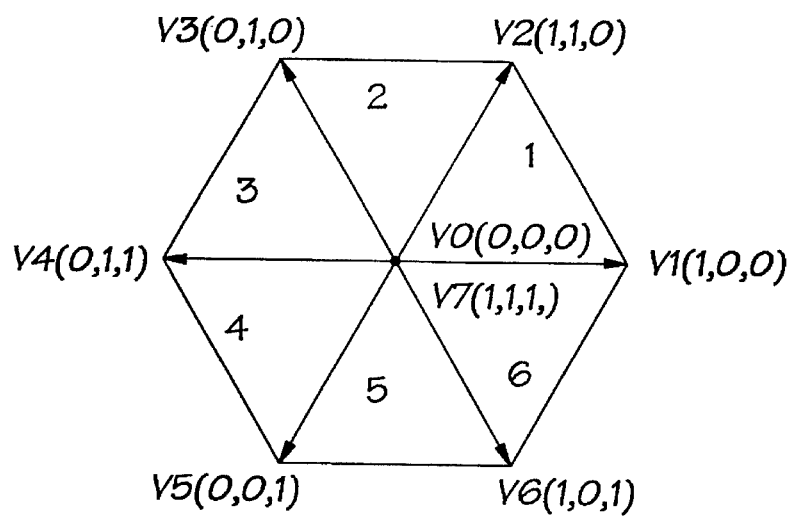
FIG. 2 is a vector diagram illustrating the voltage vectors produced by the three phase inverter circuit of FIG. 1.
Figure 8:
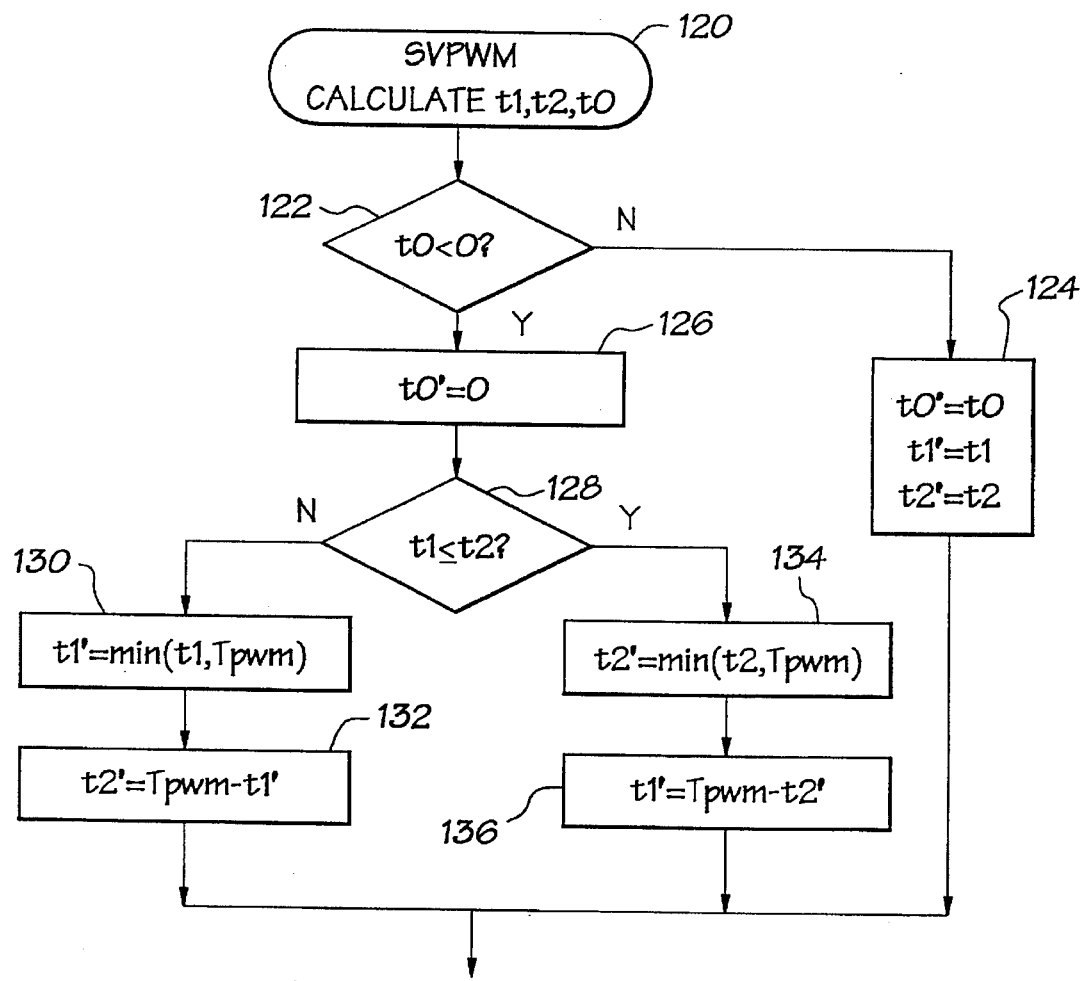
FIG. 8 is a flow chart for a first implementation of the present invention for smooth transition from SVPWM to six step operation.

The first illustrative implementation is shown in the flow chart of FIG. 8. Initially, the space vector PWM times t1, t2 and t0 for space vector PWM operation are calculated using the equations (6)–(8), see block 120. The times t1 and t2 correspond to non-zero space vectors associated with a commanded space vector such as the commanded space vector $V_s^*$ 110 and t0 correspond to a zero space vector, either V0 or V7 as shown in FIG. 2. The space vector PWM time t0 is then compared to 0, see block 122.

If t0 is equal to or greater than 0, transition space vector PWM times t1', t2' and t0' are set equal to calculated space vector PWM times t1, t2 and t0, respectively, see block 124. The inverter circuit 100 is then operated in accordance with the transition space vector PWM times t1', t2' and t0', and the appropriate connections of the switching devices SA+, SA–, SB+, SB–, SC+ and SC– are made for that TPWM.

If t0 is less than 0, t0' is set equal to 0 and the space vector PWM time t1 is compared to the space vector PWM time t2, see blocks 126, 128. If t2 is less than t1, the transition space vector PWM time t1' is set equal to the smaller of the two times t1 and TPWM, i.e., t1' is set equal to the min of t1 and TPWM, see block 130. And, the transition space vector PWM time t2' is set equal to TPWM–t1', see block 132. The inverter circuit 100 is then operated in accordance with the transition space vector PWM times t1', t2' and t0', and the appropriate connections of the switching devices SA+, SA–, SB+, SB–, SC+ and SC– are made for that TPWM.

If t2 is greater than or equal to t1, the transition space vector PWM time t2' is set equal to the smaller of t2 or TPWM, i.e., t2' is set equal to the min of t2 and TPWM, see block 134. And, the transition space vector PWM time t1' is set equal t0 TPWM–t2', see block 136. The inverter circuit 100 is then operated in accordance with the transition space vector PWM times t1', t2' and t0', and the appropriate connections of the switching devices SA+, SA–, SB+, SB–, SC+ and SC– are made for that TPWM.

Figure 9:
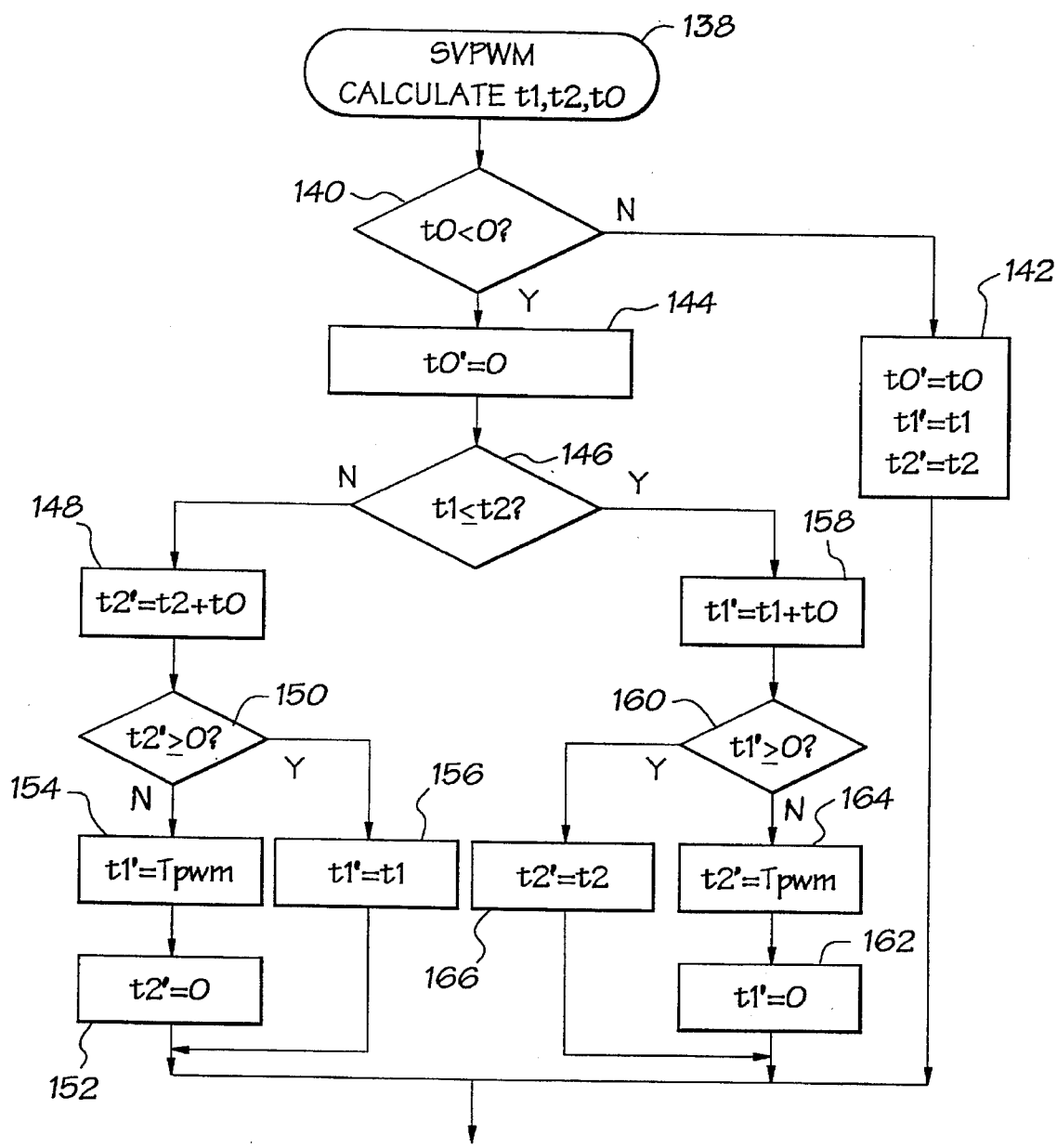
FIG. 9 is a flow chart for a second implementation of the present invention for smooth transition from SVPWM to six step operation.

The second illustrative implementation is shown in the flow chart of FIG. 9. Initially, the space vector PWM times t1, t2 and t0 for space vector PWM operation are calculated using the equations (6)–(8), see block 138. Here again, the times t1 and t2 correspond to non-zero space vectors associated with a commanded space vector such as the commanded space vector $V_s^*$ 110 and t0 correspond to a zero space vector, either V0 or V7 as shown in FIG. 2. The space vector PWM time t0 is then compared to 0, see block 140.

If t0 is equal to or greater than 0, transition space vector PWM times t1', t2' and t0' are set equal to calculated space vector PWM times t1, t2 and t0, respectively, see block 142. The inverter circuit 100 is then operated in accordance with the transition space vector PWM times t1', t2' and t0', and the appropriate connections of the switching devices SA+, SA–, SB+, SB–, SC+ and SC– are made for that TPWM.

If t0 is less than 0, t0' is set equal to 0 and the space vector PWM time t1 is compared to the space vector PWM time t2, see blocks 144, 146. If t2 is less than t1, the transition space vector PWM time t2' is set equal to the algebraic combination of the space vector PWM times t2 and t0, see block 148. The resulting transition space vector PWM time t2' is then compared to 0, see block 150. The transition space vector PWM time t2' is set equal to 0 and the transition space vector t1' to TPWM if t2' is less than 0, see blocks 152, 154. And, the transition space vector PWM time t1' is set equal to t1 if t2' is greater than or equal to 0, see block 156. The inverter circuit 100 is then operated in accordance with the transition space vector PWM times t1', t2' and t0', and the appropriate connections of the switching devices SA+, SA–, SB+, SB–, SC+ and SC– are made for that TPWM.

If t2 is greater than or equal to t1, the transition space vector PWM time t1' is set equal to the algebraic sum of t1 and t0, see block 158. The resulting transition space vector PWM time t1' is then compared to 0, see block 160. The transition space vector PWM time t1' is set equal to 0 and the transition space vector t2' to TPWM if t1' is less than 0, see blocks 162, 164. And the transition vector PWM time t2' is set equal to t2 if t1' is greater than or equal to 0, see block 166. The inverter circuit 100 is then operated in accordance with the transition space vector PWM times t1', t2' and t0', and the appropriate connections of the switching devices SA+, SA–, SB+, SB–, SC+ and SC– are made for that TPWM.

Having thus described the invention of the present application in detail and by reference to preferred embodiments thereof, it will be apparent that modifications and variations are possible without departing from the scope of the invention defined in the appended claims.

What is claimed is:

1. A method of controlling a three phase inverter circuit which provides improved transition from space vector PWM operation to six step operation, said method comprising the steps of:

calculating the space vector PWM times t1, t2 and t0 for space vector PWM operation, t1 and t2 corresponding to non-zero space vectors associated with a commanded space vector and t0 corresponding to a zero space vector, the sum of t1, t2 and t0 equaling a total pulse width modulation control period, TPWM;

comparing t0 to 0;

setting transition space vector PWM times t1', t2' and t0' for calculated t0 values less than 0 to preserve the non-zero space vector which is closer to the commanded space vector, truncate the non-zero space vector which is farther from the commanded space vector and eliminate the zero space vector; and operating the inverter circuit in accordance with the transition space vector PWM times t1', t2' and t0'.

2. A method of controlling a three phase inverter circuit as claimed in claim 1 further comprising the step of comparing the space vector PWM time t1 to the space vector PWM time t2 for calculated t0 values less than 0 and wherein the step of setting transition space vector PWM times t1', t2' and t0' for calculated t0 values less than 0 comprises setting t0' to 0 and the following steps if t2 is less than t1:

setting the transition space vector PWM time t1' equal to the smaller of the two times t1 and TPWM; and setting the transition space vector PWM time t2' equal to TPWM−t1'.

3. A method of controlling a three phase inverter circuit as claimed in claim 2 wherein the step of setting transition space vector PWM times t1', t2' and t0' for calculated t0 values less than 0 further comprises the following steps if t2 is greater than or equal to t1:

setting the transition space vector PWM time t2' equal to the smaller of t2 or TPWM; and setting the transition space vector PWM time t1' equal to TPWM−t2'.

4. A method of controlling a three phase inverter circuit as claimed in claim 1 further comprising the step of comparing the space vector PWM time t1 to the space vector PWM time t2 for calculated t0 values less than 0 and wherein the step of setting transition space vector PWM times t1', t2' and t0' for calculated t0 values less than 0 comprises setting t0' to 0 and the following steps if t2 is less than t1:

setting the transition space vector PWM time t2' to the algebraic sum of t2 and t0;

comparing t2' to 0;

setting the transition space vector PWM time t2' to 0 and the transition space vector t1' to TPWM if t2' is less than 0; and setting the transition space vector PWM time t1' to t1 if t2' is greater than or equal to 0.

5. A method of controlling a three phase inverter circuit as claimed in claim 4 wherein the step of setting transition space vector PWM times t2' and t0' for calculated to values less than 0 further comprises the following steps if t2 is greater than or equal to t1:

setting the transition space vector PWM time t1' to the algebraic sum of t1 and t0;

comparing t1' to 0;

setting the transition space vector PWM time t1' to 0 and the transition space vector t2' to TPWM if t1' is less than 0; and setting the transition vector PWM time t2' to t2 if t1' is greater than or equal to 0.

* * * * *